United States Patent
Ramb et al.

(10) Patent No.: US 11,060,413 B2
(45) Date of Patent: Jul. 13, 2021

(54) TURBINE WITH VARIABLE TURBINE GEOMETRY

(71) Applicant: BorgWarner Inc., Auburn Hills, MI (US)

(72) Inventors: Thomas Ramb, Worms (DE); Leif Heidingsfelder, Ramstein (DE); Christian Haibt, Alsbach-Haehnlein (DE); Frank Scherrer, Frankenthal (DE)

(73) Assignee: BorgWarner Inc., Auburn Hills, MI (US)

( * ) Notice: Subject to any disclaimer, the term of this patent is extended or adjusted under 35 U.S.C. 154(b) by 0 days.

(21) Appl. No.: 16/465,020

(22) PCT Filed: Nov. 27, 2017

(86) PCT No.: PCT/US2017/063222
§ 371 (c)(1),
(2) Date: May 29, 2019

(87) PCT Pub. No.: WO2018/102244
PCT Pub. Date: Jun. 7, 2018

(65) Prior Publication Data
US 2019/0323375 A1    Oct. 24, 2019

(30) Foreign Application Priority Data
Nov. 30, 2016   (DE) .......................... 102016123072.3

(51) Int. Cl.
*F01D 17/16*   (2006.01)
*F02C 6/12*   (2006.01)

(52) U.S. Cl.
CPC .............. *F01D 17/165* (2013.01); *F02C 6/12* (2013.01); *F05D 2220/40* (2013.01); *F05D 2260/231* (2013.01); *F05D 2260/31* (2013.01)

(58) Field of Classification Search
CPC ...... F01D 17/165; F02C 6/12; F05D 2220/40; F05D 2260/231; F05D 2260/31; F05D 2260/30
See application file for complete search history.

(56) References Cited

U.S. PATENT DOCUMENTS

2005/0252210 A1 * 11/2005 Shiraishi ............... F01D 17/165
60/602
2011/0014033 A1    1/2011 Boening et al.

FOREIGN PATENT DOCUMENTS

EP       1892382 A2    2/2008
WO   2009115451 A1    9/2009

OTHER PUBLICATIONS

Written Opinion and International Search Report dated Feb. 12, 2018, in International Application No. PCT/US2017/063222.

* cited by examiner

*Primary Examiner* — Audrey K Bradley
*Assistant Examiner* — Edward Bushard
(74) *Attorney, Agent, or Firm* — Eric L. Doyle; Stephan A. Pendorf; Patent Central LLC

(57) ABSTRACT

A turbine with variable turbine geometry for an internal combustion engine. The turbine includes a bearing housing, a turbine housing, and a cartridge which has a blade bearing ring for mounting a plurality of adjustable blades. The cartridge is fixed on the bearing housing via at least three bolts.

15 Claims, 2 Drawing Sheets

TURBINE WITH VARIABLE TURBINE GEOMETRY

FIELD OF THE INVENTION

The present invention relates to a turbocharger with variable turbine geometry.

BACKGROUND INFORMATION

Increasingly more vehicles of the more recent generation are equipped with charging devices. In order to achieve the target demands and the legal requirements, it is imperative to promote development in the complete drive train and also to optimize the individual components as well as the system as a whole with respect to their reliability and efficiency.

Exhaust gas turbochargers are known, for example, in which a turbine with a turbine wheel is driven by the exhaust gas flow of the internal combustion engine. A compressor wheel, which is arranged with a turbine wheel on a mutual shaft, compresses the fresh air taken in for the engine. By this means, the air or oxygen amount, available to the engine for combustion, is increased, which in turn leads to an increased output of the internal combustion engine.

Turbines may also be decoupled from the exhaust gas turbocharger or, for example, be used in combination with an air supply for a fuel cell engine.

Since the turbines are driven by the exhaust gas flow, very high temperatures occur in the area of the turbine wheel and the turbine housing. In turbines with variable turbine geometry (VTG), the cartridge of the VTG, which is arranged in the interior of the turbine and comprises a blade bearing ring with a plurality of adjustably mounted blades, also reaches very high temperatures. The cartridge is coupled to a bearing housing, which functions for mounting the shaft on which the turbine wheel is fixed, for which reason the heat of the cartridge is also transmitted to the bearing housing. Temperatures that are too high in the bearing housing may negatively effect the efficiency and the susceptibility to wear. In addition, heat dissipation and heat transfer reduces the energy available for driving the turbine in the turbine housing.

The object of the present invention is correspondingly to provide a turbine with improved temperature management, in particular with respect to the contact area between a cartridge of a variable turbine geometry and a turbine housing.

BRIEF SUMMARY OF THE INVENTION

The present invention relates to a turbine with variable turbine geometry according to claim 1, a turbocharger according to claim 12, and a method for mounting a turbine with variable turbine geometry according to claim 13.

The turbine according to the invention comprises a bearing housing, a turbine housing, and a cartridge which has a blade bearing ring for mounting a plurality of adjustable blades. The cartridge is fixed on the bearing housing via at least three bolts. Because the bearing housing is only connected to the cartridge via three bolts, less heat is transmitted from the cartridge, past which the hot exhaust gases flow, to the bearing housing. This means that the energy from the exhaust gases remains in the turbine housing and may thus be used for driving the turbine, which leads to a higher efficiency of the turbine. Also, due to the lower heat transfer to the bearing housing, a water core in the bearing housing, which normally functions to cool the bearing housing and the bearing, may, for example, be omitted. A lower heat development in the bearing housing leads to a reduced risk of the emergence of boiling oil, which circulates to lubricate the bearing in the bearing housing. Thus, the risk of premature wear and failure of piston ring seals, which may be arranged in the bearing housing, may also be prevented, which might otherwise lead to oil leakage and, in the worst case, to the total loss of the turbine or the turbocharger.

In addition, the fixing of the cartridge via bolts also reduces the heat transfer up to the compressor, for which reason the efficiency of the compressor may also be increased. Due to these effects, possibilities also result for reducing the costs for production and the installation size of the turbine. Another advantage is that the bearing housing and the cartridge may be easily aligned axially and/or radially with one another via the bolts. This in turn simplifies the assembly process for the turbine.

In embodiments, the bearing housing may have first holes and the blade bearing ring may have second holes, in each case corresponding to the number of bolts, and in each case a first end of the bolt is arranged in one of the corresponding first holes and a second end of the bolt is arranged in one of the corresponding second holes. The bolts may be arranged in the holes rotationally fixed and/or resistant to axial displacement. A press fit may be provided between the first ends of the bolts and the first holes and/or between the second ends of the bolts and the second holes.

In embodiments, which may be combined with all previously described embodiments, the first holes may be arranged distributed across a radial lateral surface of the bearing housing and the second holes may be arranged distributed across a radial lateral surface of the blade bearing ring of the cartridge.

In embodiments, which may be combined with all previously described embodiments, the first holes and/or the second holes may be configured as blind holes.

In embodiments, which may be combined with all previously described embodiments, a first flange may be provided in the form of a circumferential first projection in the direction of the turbine housing, wherein the first holes are arranged in the first projection. A second flange may be provided on the blade bearing ring in the form of a circumferential second projection in the direction of the bearing housing, wherein the second holes are arranged in the second projection. Alternatively, axial first projections in the direction of the turbine housing corresponding to the number of bolts may be provided on the bearing housing, wherein the first holes are arranged in the first projections. Likewise, axial second projections in the direction of the turbine housing corresponding to the number of bolts may be provided on the blade bearing ring, wherein the second holes are arranged in the second projections. The first projection(s) and the second projection(s) and the first and second holes and the bolts may be configured in such a way that the bearing housing and the blade bearing ring do not contact one another. Alternatively, the first projection(s) and the second projection(s) and the first and second holes and the bolts may be configured in such a way that the opposite radial surfaces of the first and second projections contact one another.

In embodiments, which may be combined with all previously described embodiments, the at least three bolts may be arranged distributed equally in the circumferential direction.

In embodiments, which may be combined with all previously described embodiments, the at least three bolts may be arranged radially within an adjusting ring of the cartridge.

In embodiments, which may be combined with all previously described embodiments, the at least three bolts may be arranged parallel to the axis of rotation of a shaft of the turbine.

In embodiments, which may be combined with all previously described embodiments, a heat sheet may be arranged between the bearing housing and the blade bearing ring radially within the bolts.

In embodiments, which may be combined with all previously described embodiments, a through passage may be provided radially outward between the blade bearing ring and the bearing housing and/or the turbine housing. The through passage may extend across the entire perimeter.

In embodiments, which may be combined with all previously described embodiments, the bolts may have a centrally arranged axial hole which extends through the bolts.

In embodiments, which may be combined with all previously described embodiments, a central area of the bolts may have a larger diameter than the first and second ends, by which means a collar is formed. Alternatively, a sleeve may be arranged around the central area of the bolts, by which means a collar is formed. A radial contact surface of the collar facing in the direction of the bearing housing may rest flat on an opposite radial surface of the bearing housing. It is advantageous for collars of this type that a flat axial support of the blade bearing ring on the turbine housing is enabled via the bolts or the sleeves around the bolts. The radial surface of the bearing housing may therefore be ground very flat for this, by which means a low tolerance range may be set in the connection area between the bolts and the bearing housing.

The invention additionally comprises a turbocharger comprising a turbine according to any one of the previously described embodiments.

The invention additionally comprises a method for assembling a turbine with variable turbine geometry, wherein the method comprises the following steps: providing a bearing housing, providing a cartridge of a variable turbine geometry, and fixing the cartridge to the bearing housing via at least three bolts.

In embodiments, at least three first holes may be provided distributed across a radial outer surface of the bearing housing, at least three second holes may be provided distributed across a radial outer surface of a blade bearing ring of the cartridge, and in each case a first end of the bolt may be arranged in one of the corresponding first holes and a second end of the bolt may be arranged in one of the corresponding second holes. The first ends of the at least three bolts may be initially arranged in each case in one of the first holes of the bearing housing, and the cartridge is subsequently connected to the bearing housing so that the second ends of the bolts are arranged in each case in one of the second holes of the cartridge. Alternatively, the second ends of the at least three bolts may be initially arranged in each case in one of the second holes of the cartridge, and the cartridge with the bolts is subsequently connected to the bearing housing so that the first ends of the bolts are arranged in each case in one of the first holes.

Additional details and features of the invention are subsequently described by way of the figures.

DETAILED DESCRIPTION OF THE INVENTION

Embodiments of the turbine according to the invention with variable turbine geometry will subsequently be described based on the figures. All of the subsequently described details and advantages apply both to the turbine and also to a turbocharger with a corresponding turbine. In addition, a method for assembling a turbine with variable turbine geometry is described.

Figure 1A:
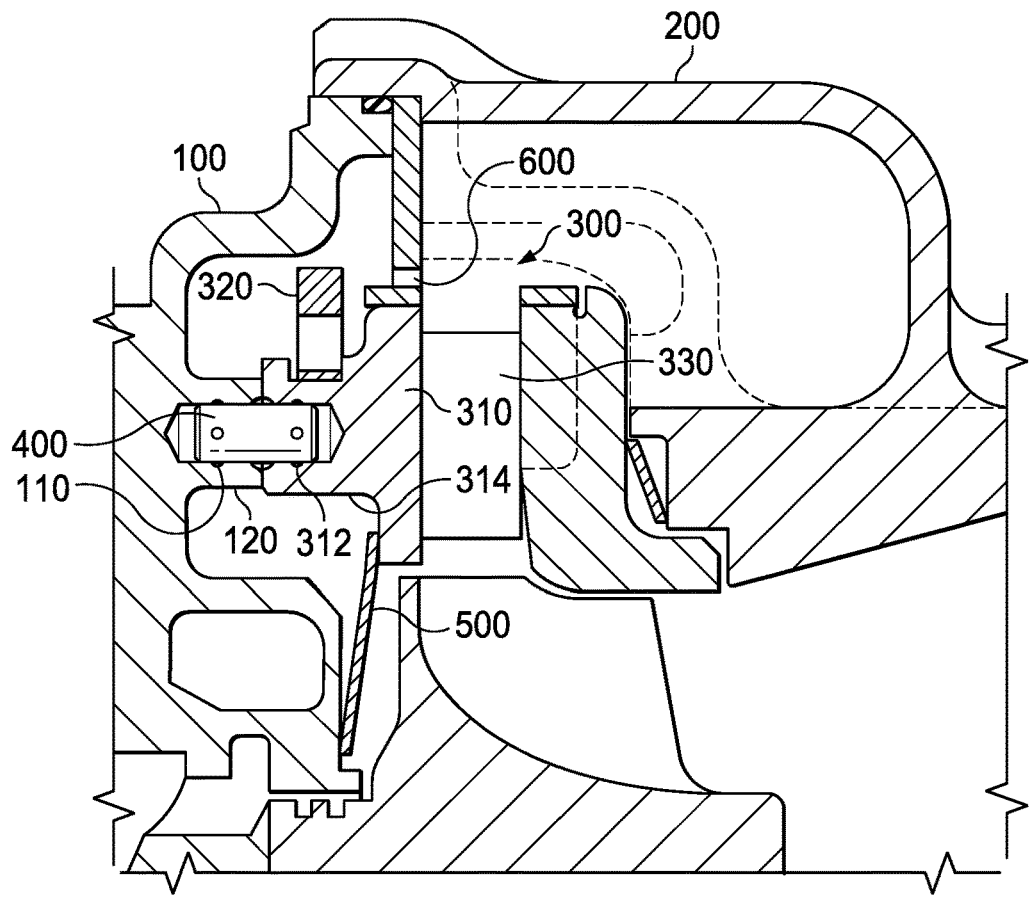
FIG. 1A shows a partial section of a first embodiment of the turbine according to the invention.

FIG. 1A shows a side view of the upper half of one embodiment of the turbine according to the invention. The turbine comprises a bearing housing 100, a turbine housing 200, and a cartridge 300 which has a blade bearing ring 310 for mounting a plurality of adjustable blades 330. Cartridge 300 is fixed on bearing housing 100 via at least three bolts 400. Bolts 400 may be manufactured, for example, from a temperature-stable material. Because bearing housing 100 is only connected to the cartridge via three bolts 400, less heat from the exhaust gases flowing past cartridge 300 is transmitted to bearing housing 100. This means that the energy from the exhaust gases remains in turbine housing 200 and may thus be used for driving the turbine wheel of the turbine, which leads to a higher efficiency of the turbine. Also, due to the lower heat transfer to bearing housing 100, a water core in bearing housing 100, which normally functions to cool bearing housing 100 and the bearing arranged therein, may, e.g., be omitted. A lower heat development in bearing housing 100 additionally leads to a reduced risk of the emergence of boiling oil, which circulates to lubricate the bearing in bearing housing 100. Thus, the risk of premature wear and failure of piston ring seals, which may be arranged in bearing housing 100, may also be prevented, which might otherwise lead to oil leakage and, in the worst case, to the total loss of the turbine or the turbocharger.

In addition, the fixing of cartridge 300 via bolts 400 also reduces the heat transfer up to the compressor (not shown in the figures), for which reason the efficiency of the compressor may also be increased. Due to these effects, possibilities also result for reducing the costs for production and the installation size of the turbine. Another advantage is that bearing housing 100 and cartridge 300 may be easily aligned axially and/or radially with one another via bolts 400. This in turn simplifies the assembly process for the turbine.

As is clear in FIG. 1A, bearing housing 100 has first holes 110. Blade bearing ring 310 comprises second holes 312. The number of first holes 110 and of second holes 312 corresponds in each case to the number of bolts 400. In each case, a first end of bolt 400 is arranged in one of the corresponding first holes 110, and a second end of bolt 400 is arranged in one of the corresponding second holes 312, so that bolt 400 forms a connection between cartridge 300 and bearing housing 100, by which means cartridge 300 is fixed on bearing housing 100 and is positioned in turbine housing 200. Bolts 400 may be arranged in first and/or second holes 110, 312 rotationally fixed and/or resistant to axial displacement. A press fit may be provided between the first ends of bolts 400 and first holes 110 and/or between the second ends of bolts 400 and second holes 312.

The at least three bolts 400 are aligned parallel to an axis of rotation of a shaft of the turbine and may be arranged distributed uniformly in the circumferential direction. Correspondingly then, first holes 110 are arranged distributed uniformly in the circumferential direction across a radial lateral surface of bearing housing 100 and second holes 312 across a radial lateral surface of blade bearing ring 310 of cartridge 300. As is clear in FIGS. 1A to 1C, first holes 110 and second holes 312 may be configured as blind holes. In addition, the at least three bolts 400 are arranged radially within an adjusting ring 320 of cartridge 300 (see FIG. 1A).

Bolts 400 may additionally have a hole arranged centrally and extending axially, said hole extending through bolt 400 (not shown in the figures).

Figure 1B:
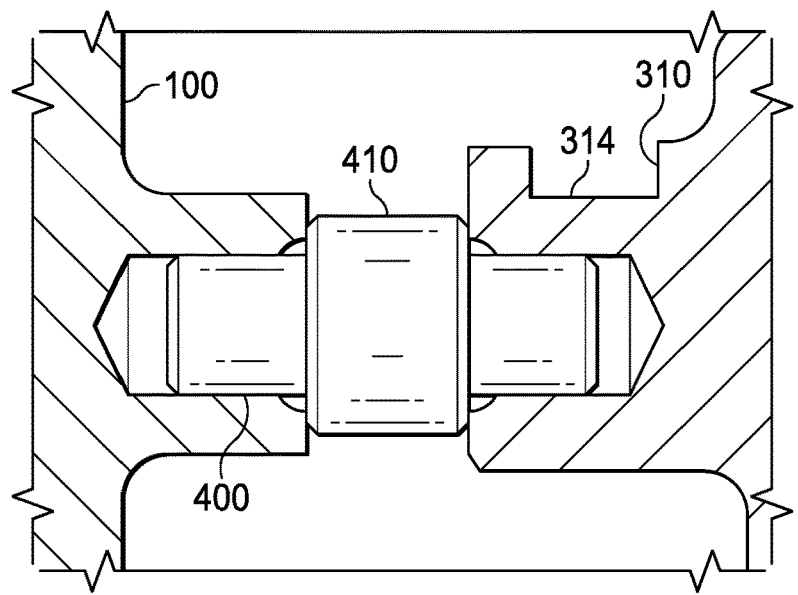
FIG. 1B shows an enlarged section of a second embodiment of the turbine according to the invention.

In FIGS. 1A and 1B, an embodiment of the turbine is depicted which has a first flange on bearing housing 100 in the form of a circumferential first projection 120, which faces in the direction of turbine housing 200, wherein first holes 110 are arranged in first projection 120. A second flange is provided on blade bearing ring 310 in the form of a circumferential second projection 314 in the direction of bearing housing 100, wherein second holes 110 are arranged in second projection 314. In one alternative embodiment, axial first projections 120 in the direction of turbine housing 200 corresponding to the number of bolts 400 may be provided on bearing housing 100 (thus no projection extends across the entire perimeter), wherein first holes 110 are arranged in first projections 120. Likewise, axial second projections 314 in the direction of turbine housing 100 corresponding to the number of bolts 400 may be provided on blade bearing ring 310, wherein second holes 312 are arranged in second projections 314. However, a projection extending across the perimeter may also be provided on bearing housing 100 or on cartridge 300, and this may be combined with individual opposite projections (on the corresponding other component from bearing housing 100 and cartridge 300) corresponding to the number of bolts 400. As is clear in the embodiments in FIGS. 1B and 1C, first projection(s) and second projection(s) 120, 314 and first and second holes 110, 312 and bolts 400 are configured in such a way that bearing housing 100 and blade bearing ring 310 do not contact one another. Alternatively, (see the embodiment in FIG. 1A), first projection(s) and second projection(s) 120, 314 and first and second holes 110, 312 and bolts 400 may be configured in such a way that the opposite radial surfaces of first and second projections 120, 314 contact one another.

A heat sheet 500 may be arranged between bearing housing 100 and blade bearing ring 310 radially within bolts 400. An embodiment of the turbine with heat sheet 500 is shown, for example, in FIG. 1A.

Likewise, in the embodiment of the turbine shown in FIG. 1A, a through passage 600, which extends outward in the radial direction is provided between blade bearing ring 310 and bearing housing 100 and/or turbine housing 200. The through passage may extend across the entire perimeter. In particular, there is no contact between cartridge 300 or blade bearing ring 310 of cartridge 300 and bearing housing 100 and/or turbine housing 200 in the outward radial direction.

Figure 1C:
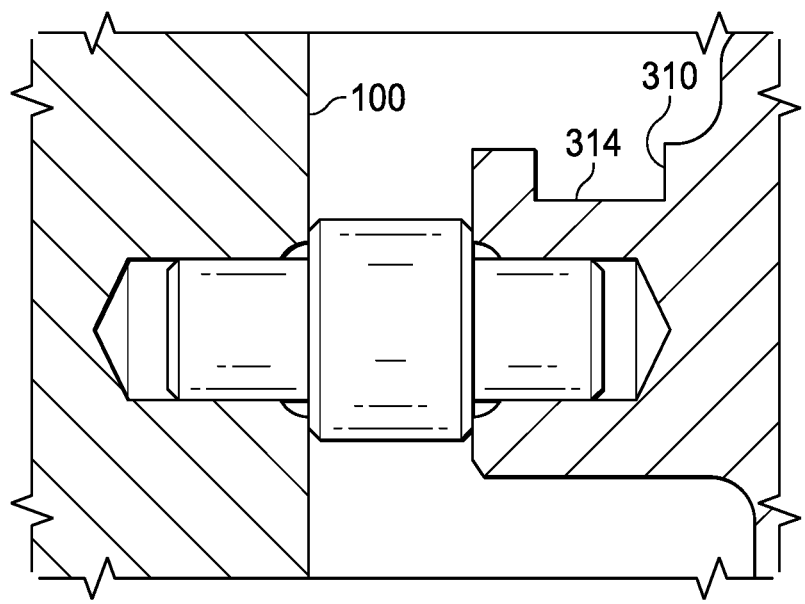
FIG. 1C shows an enlarged section of a third embodiment of the turbine according to the invention.

As is shown in the embodiments in FIGS. 1B and 1C, a central area of bolts 400 may have a larger diameter than the first and second ends of bolts 400, by which means a collar 410 is formed. Bolts 400 with collar 410 may be configured as integral, one-piece components. Alternatively, a sleeve may be arranged around the central area of bolts 400, by which means a collar 410 is formed. That means that bolts 400 may be configured, for example, as a stepped pin, a pin with sleeve, or a collet with a sleeve around it. If bolts 400 with collar 410 are used, then a radial contact surface of collar 410 facing in the direction of bearing housing 100 may rest flat on an opposite radial surface of bearing housing 100. Let it be clarified at this point that within the context of this application, radial surfaces relate to surfaces that lie in planes that are arranged perpendicular to the axis of rotation of the shaft of the turbine. As is shown in FIG. 1B, the radial surface of the bearing housing may be formed on projection 110. Alternatively, as is depicted in FIG. 1C, the contact surface of collar 410 may lie on a planar radial surface (without projection) of bearing housing 100. It is advantageous for collars 410 of this type that a flat axial support of blade bearing ring 310 on turbine housing 100 is enabled via bolts 400 or the sleeves around bolts 400. The radial surface of bearing housing 100, in particular if no projection(s) 110 is/are provided, may therefore be ground very flat for this, by which means a low tolerance range may be set in the connection area between bolts 400 and bearing housing 100.

The invention additionally comprises a turbocharger comprising a turbine according to any one of the previously described embodiments. In addition to the turbine with bearing housing 100, turbine housing 200, and cartridge 300, a turbocharger of this type comprises a compressor with a compressor wheel arranged therein which is driven via a common shaft by the turbine wheel of the turbine.

The invention additionally comprises a method for assembling a turbine with variable turbine geometry. The method comprises the following steps: initially a bearing housing 100 and a cartridge 300 of a variable turbine geometry are provided. Cartridge 300 is subsequently fixed on bearing housing 100 via at least three bolts 400. Finally, a turbine housing 200, which surrounds cartridge 300 and a turbine wheel arranged within the cartridge, may be coupled to bearing housing 100.

To apply and position bolts 400, at least three first holes 110 are provided distributed across a radial outer surface of bearing housing 100, and at least three second holes 312 are provided distributed across a radial outer surface of a blade bearing ring 310 of cartridge 300. During the assembly, in each case a first end of bolts 400 is arranged in one of the corresponding first holes 110 and a second end of bolts 400 is arranged in one of the corresponding second holes 312.

The first ends of the at least three bolts 400 may be initially arranged in each case in one of first holes 110 of bearing housing 100, and cartridge 300 may be subsequently connected to bearing housing 100 so that the second ends of bolts 400 are arranged in each case in one of second holes 312 of cartridge 300. Alternatively, the second ends of the at least three bolts 400 may be initially arranged in each case in one of second holes 312 of cartridge 300, and cartridge 300 with bolts 400 may be subsequently connected to bearing housing 100 so that the first ends of bolts 400 are arranged in each case in one of first holes 312.

Although the present invention has been described and is defined in the attached claims, it should be understood that the invention may also be alternatively defined according to the following embodiments:

1. A turbine with variable turbine geometry for an internal combustion engine comprising
    a bearing housing (100);
    a turbine housing (200); and
    a cartridge (300) which has a blade bearing ring (310) for mounting a plurality of adjustable blades (330), characterized in that the cartridge (300) is fixed on the bearing housing (100) via at least three bolts (400).
2. The turbine according to Embodiment 1, characterized in that the bearing housing (100) has first holes (110) and the blade bearing ring (310) has second holes (312), in each case corresponding to the number of bolts (400), and in each case a first end of the bolt (400) is arranged in one of the corresponding first holes (110) and a second end of the bolt (400) is arranged in one of the corresponding second holes (312).
3. The turbine according to Embodiment 2, characterized in that the bolts (400) are arranged in the first and/or second holes (110, 312) rotationally fixed and/or resistant to axial displacement.
4. The turbine according to Embodiment 2 or Embodiment 3, characterized in that a press fit is provided between the first ends of the bolts (400) and the first holes (110) and/or between the second ends of the bolts (400) and the second holes (312).
5. The turbine according to any one of Embodiments 2 to 4, characterized in that the first holes (110) are arranged distributed across a radial lateral surface of the bearing housing (100) and the second holes (312) are arranged distributed across a radial lateral surface of the blade bearing ring (310) of the cartridge (300).
6. The turbine according to any one of Embodiments 2 to 5, characterized in that the first holes (110) and/or the second holes (312) are configured as blind holes.
7. The turbocharger according to any one of Embodiments 2 to 6, characterized in that a first flange is provided on the bearing housing (100) in the form of a circumferential first projection (120) in the direction of the turbine housing (200), wherein the first holes (110) are arranged in the first projection (120).
8. The turbocharger according to any one of Embodiments 2 to 7, characterized in that a second flange is provided on the blade bearing ring (310) in the form of a circumferential second projection (314) in the direction of the bearing housing (100), wherein the second holes (110) are arranged in the second projection (314).
9. The turbine according to any one of Embodiments 2 to 6 and 8, characterized in that axial first projections (120) in the direction of the turbine housing (200) corresponding to the number of bolts (400) are provided on the bearing housing (100), wherein the first holes (110) are arranged in the first projections (120).
10. The turbine according to any one of Embodiments 2 to 5 and 7, characterized in that axial second projections (314) in the direction of the turbine housing (100) corresponding to the number of bolts (400) are provided on the blade bearing ring (310), wherein the second holes (312) are arranged in the second projections (314).
11. The turbine according to any one of Embodiments 8 to 10, characterized in that the first projection(s) and the second projection(s) (120, 314), the first and second holes (110, 312), and the bolts (400) are configured in such a way that the bearing housing (100) and the blade bearing ring (310) do not contact one another.
12. The turbine according to any one of Embodiments 8 to 10, characterized in that the first projection(s) and the second projection(s) (120, 314), the first and second holes (110, 312), and the bolts (400) are configured in such a way that the opposite radial surfaces of the first and second projections (120, 314) contact one another.
13. The turbine according to any one of preceding embodiments, characterized in that the at least three bolts (400) are arranged uniformly distributed in the circumferential direction.
14. The turbine according to any one of preceding embodiments, characterized in that the at least three bolts (400) are arranged radially within an adjusting ring (320) of the cartridge (300).
15. The turbine according to any one of preceding embodiments, characterized in that the at least three bolts (400) are arranged parallel to the axis of rotation of a shaft of the turbine.
16. The turbine according to any one of preceding embodiments, characterized in that a heat sheet (500) is arranged between the bearing housing (100) and the blade bearing ring (310) radially within the bolts (400).
17. The turbine according to any one of preceding embodiments, characterized in that a through passage (600) is provided radially outward between the blade bearing ring (310) and the bearing housing (100) and/or the turbine housing (200).
18. The turbine according to Embodiment 17, characterized in that the through passage extends across the entire perimeter.
19. The turbine according to any one of preceding embodiments, characterized in that the bolts (400) have a centrally arranged axial hole which extends through the bolts (400).
20. The turbine according to any one of preceding embodiments, characterized in that a central area of the bolts (400) has a larger diameter than the first and second ends, by which means a collar (410) is formed, or a sleeve is arranged around a central area of the bolts, by which means a collar (410) is formed.
21. The turbine according to Embodiment 20, characterized in that a radial contact surface of the collar (410) facing in the direction of the bearing housing (100) rests flat on an opposite radial surface of the bearing housing (100).
22. A turbocharger with a turbine according to any one of preceding embodiments.
23. A method for assembling a turbine with variable turbine geometry, comprising:
providing a bearing housing (100);
providing a cartridge (300) with a variable turbine geometry;
fixing the cartridge (300) on the bearing housing (100) via at least three bolts (400).
24. The method according to Embodiment 23, characterized in that at least three first holes (110) are provided distributed across a radial outer surface of the bearing housing (100), at least three second holes (312) are provided distributed across a radial outer surface of a blade bearing ring (310) of the cartridge (300), and in each case a first end of the bolt (400) is arranged in one of the corresponding first holes (110) and a second end of the bolt (400) is arranged in one of the corresponding second holes (312).
25. The method according to Embodiment 24, characterized in that the first ends of the at least three bolts (400) are initially arranged in each case in one of the first holes (110) of the bearing housing (100) and the cartridge (300) is subsequently connected to the bearing housing (100) so that the second ends of the bolts (400) are arranged in each case in one of the second holes (312) of the cartridge (300).
26. The method according to Embodiment 24, characterized in that the second ends of the at least three bolts (400) are initially arranged in each case in one of the second holes (312) of the cartridge (300), and the cartridge (300) with the bolts (400) is subsequently connected to the bearing housing (100) so that the first ends of the bolts (400) are arranged in each case in one of the first holes (312).

The invention claimed is:
1. A turbine with variable turbine geometry for an internal combustion engine comprising a bearing housing (100);
a turbine housing (200); and
a cartridge (300) which has a blade bearing ring (310) for mounting a plurality of adjustable blades (330),
wherein the cartridge (300) is fixed on the bearing housing (100) via at least three bolts (400),
wherein the bearing housing (100) has bearing housing holes (110) and the blade bearing ring (310) has ring holes (312), in each case corresponding to the number of bolts (400), and in each case a first end of the bolt (400) is arranged in one of the corresponding bearing housing holes (110) and a second end of the bolt (400) is arranged in one of the corresponding ring holes (312),
wherein a press fit is provided between the first ends of the bolts (400) and the bearing housing holes (110) and/or between the second ends of the bolts (400) and the ring holes (312), and
wherein a first flange is provided on the bearing housing (100) in the form of a circumferential first projection (120) extending in the direction of the turbine housing (200) and having an end face facing the turbine housing (200), and wherein the bearing housing holes (110) are arranged in the circumferential first projection (120).

2. The turbine according to claim 1, wherein the bolts (400) are arranged in the holes (110) of the circumferential first projection (120) and/or ring holes (110, 312) rotationally fixed and/or resistant to axial displacement.

3. The turbocharger according to claim 1, wherein a second flange is provided on the blade bearing ring (310) in the form of a circumferential second projection (314) in the direction of the bearing housing (100), wherein the ring holes (110) are arranged in the second projection (314).

4. The turbine according to claim 1, wherein axial second projections (314) in the direction of the turbine housing (100) corresponding to the number of bolts (400) are provided on the blade bearing ring (310), wherein the ring holes (312) are arranged in the second projections (314).

5. The turbine according to claim 1, wherein a first flange is provided on the bearing housing (100) in the form of at least one circumferential first projection (120) in the direction of the turbine housing (200), wherein the bearing housing holes (110) are arranged in the at least one first projection (120), wherein a second flange is provided on the blade bearing ring (310) in the form of at least one circumferential second projection (314) in the direction of the bearing housing (100), wherein the ring holes (110) are arranged in the at least one second projection (314), wherein the at least one first projection and the at least one second projection (120, 314), the bearing housing and ring holes (110, 312), and the bolts (400) are configured in such a way that the bearing housing (100) and the blade bearing ring (310) do not contact one another, or the at least one first projection and the at least one second projection (120, 314), the bearing housing and ring holes (110, 312), and the bolts (400) are configured in such a way that the opposite radial surfaces of the at least one first projection and at least one second projection (120, 314) contact one another.

6. The turbine according to claim 1, wherein a central area of the bolts (400) has a larger diameter than the first and second ends, whereby a collar (410) is formed, or a sleeve is arranged around a central area of the bolts, whereby a collar (410) is formed.

7. The turbine according to claim 6, wherein a radial contact surface of the collar (410) facing in the direction of the bearing housing (100) rests flat on an opposite radial surface of the bearing housing (100).

8. The turbine according to claim 1, wherein the cartridge (300) lies against the end face of the circumferential first projection (120).

9. The turbine according to claim 1, wherein the bolts (400) are each provided with a sleeve (410), and wherein the cartridge (300) lies against the sleeve (410).

10. A turbocharger with the turbine according to claim 1.

11. A turbine with variable turbine geometry for an internal combustion engine comprising
a bearing housing (100);
a turbine housing (200); and
a cartridge (300) which has a blade bearing ring (310) for mounting a plurality of adjustable blades (330),
wherein the cartridge (300) is fixed on the bearing housing (100) via at least three bolts (400),
wherein the bearing housing (100) has axial first projections (120) in the direction of the turbine housing (200) with bearing housing holes (110) in the axial first projections (120) and the blade bearing ring (310) has ring holes (312), in each case corresponding to the number of bolts (400), and in each case a first end of the bolt (400) is arranged in one of the corresponding bearing housing holes (110) and a second end of the bolt (400) is arranged in one of the corresponding ring holes (312), wherein a press fit is provided between the first ends of the bolts (400) and the bearing housing holes (110) and/or between the second ends of the bolts (400) and the ring holes (312), and, wherein the axial first projections (120) each have an end face facing the turbine housing.

12. The turbine according to claim 11, wherein the cartridge (300) lies against the end faces of the axial first projection (120).

13. The turbine according to claim 11, wherein the cartridge (300) lies against the sleeve (410).

14. A method for assembling a turbine with variable turbine geometry to minimize a heat transfer contact surfaces, comprising:
providing a bearing housing (100) with a first flange provided on the bearing housing (100) in the form of a circumferential first projection (120) extending in the direction of the turbine housing (200) and having an end face facing the turbine housing (200), or the bearing housing (100) has axial first projections (120) in the direction of the turbine housing (200) with each axial projection (120) having an end face facing the turbine housing (200),
providing a cartridge (300) with a variable turbine geometry; and
fixing the cartridge (300) on the bearing housing (100) via at least three bolts (400),
wherein the cartridge (300) contacts the bearing housing (100) only at the end face of the circumferential first projection (120) of the bearing housing or the end face of each axial first projection (120),
wherein at least three ring holes (312) are provided in the blade bearing ring (310) of the cartridge (300), and in each case a first end of the bolt (400) is arranged in one of the corresponding bearing housing holes (110) and a second end of the bolt (400) is arranged in one of the corresponding ring holes (312), and
wherein a press fit is provided between the first ends of the bolts (400) and the bearing housing holes (110) of the circumferential first projection (120) or axial first projections (120) and/or between the second ends of the bolts (400) and the ring holes (312), thereby minimizing heat transfer contact surfaces between the cartridge (300) and bearing housing (100).

15. The method according to claim 14, wherein the first ends of the at least three bolts (400) are initially arranged in each case in one of the bearing housing holes (110) of the bearing housing (100) and the cartridge (300) is subsequently connected to the bearing housing (100) so that the second ends of the bolts (400) are arranged in each case in one of the ring holes (312) of the cartridge (300), or the second ends of the at least three bolts (400) are initially arranged in each case in one of the ring holes (312) of the cartridge (300), and the cartridge (300) with the bolts (400) is subsequently connected to the bearing housing (100) so that the first ends of the bolts (400) are arranged in each case in one of the bearing housing holes (312).

\* \* \* \* \*